US007169046B2

(12) United States Patent
Webb et al.

(10) Patent No.: US 7,169,046 B2

(45) **Date of Patent: *Jan. 30, 2007**

(54) GAMING DEVICE HAVING A FIRST GAME SCHEME INVOLVING A SYMBOL GENERATOR, A SECOND GAME AND FIRST GAME TERMINATOR

(75) Inventors: Bayard S. Webb, Sparks, NV (US); Anthony J. Baerlocher, Reno, NV (US)

(73) Assignee: IGT, Reno, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 11/301,773

(22) Filed: Dec. 13, 2005

(65) Prior Publication Data

US 2006/0094496 A1 May 4, 2006

Related U.S. Application Data

(63) Continuation of application No. 10/792,954, filed on Mar. 4, 2004, now Pat. No. 6,981,917, which is a continuation of application No. 10/231,679, filed on Aug. 30, 2002, now Pat. No. 6,733,389, which is a continuation-in-part of application No. 10/174,789, filed on Jun. 19, 2002, now Pat. No. 6,682,419, which is a continuation of application No. 09/689,495, filed on Oct. 12, 2000, now Pat. No. 6,461,241.

(51) Int. Cl.
*A63F 13/00* (2006.01)

(52) U.S. Cl. ........................................................ 463/20

(58) Field of Classification Search ............ 463/16–22, 463/30, 31, 25; 273/143 R, 138.1
See application file for complete search history.

(56) References Cited

U.S. PATENT DOCUMENTS

| | | | |
|---|---|---|---|
| 4,695,053 | A | 9/1987 | Vazquez, Jr. et al. |
| 4,775,155 | A | 10/1988 | Lees |
| 5,393,057 | A | 2/1995 | Marnell, II |

(Continued)

FOREIGN PATENT DOCUMENTS

| | | |
|---|---|---|
| EP | 0 449 433 A2 | 2/1991 |

(Continued)

OTHER PUBLICATIONS

Bingo Game Advertisement, written by Casino Data System, published in 1998.

(Continued)

*Primary Examiner*—Kim Nguyen
(74) *Attorney, Agent, or Firm*—Bell, Boyd & Lloyd LLC

(57) ABSTRACT

A gaming device including a primary game having one or more symbol generators and one or more secondary games associated with the symbol generators. The gaming device activates the symbol generators for a number of activations. When the symbol generator generates one or more predetermined symbols, the gaming device operates one or more of the secondary games associated with the symbol generators. In one embodiment, the gaming device continues to activate the symbol generators until at least one of the symbol generators generates one or more termination symbols, or until there are no activations remaining in the primary game.

66 Claims, 15 Drawing Sheets

U.S. PATENT DOCUMENTS

| | | | |
|---|---|---|---|
| 5,411,271 | A | 5/1995 | Mirando |
| 5,536,016 | A | 7/1996 | Thompson |
| 5,611,730 | A | 3/1997 | Weiss |
| 5,639,089 | A | 6/1997 | Matsumoto et al. |
| 5,641,730 | A | 6/1997 | Brown |
| 5,645,486 | A | 7/1997 | Nagao et al. |
| 5,755,619 | A | 5/1998 | Matsumoto et al. |
| 5,769,716 | A | 6/1998 | Saffari et al. |
| 5,788,573 | A | 8/1998 | Baerlocher et al. |
| 5,823,874 | A | 10/1998 | Adams |
| 5,833,537 | A | 11/1998 | Barrie |
| 5,848,932 | A | 12/1998 | Adams |
| 5,851,148 | A | 12/1998 | Brune et al. |
| 5,882,261 | A | 3/1999 | Adams |
| 5,927,714 | A | 7/1999 | Kaplan |
| 5,935,002 | A | 8/1999 | Falciglia |
| 5,947,820 | A | 9/1999 | Morro et al. |
| 5,980,384 | A | 11/1999 | Barrie |
| 5,997,401 | A | 12/1999 | Crawford |
| 6,019,369 | A | 2/2000 | Nakagawa et al. |
| 6,033,307 | A | 3/2000 | Vancura |
| 6,059,289 | A | 5/2000 | Vancura |
| 6,059,658 | A | 5/2000 | Mangano et al. |
| 6,089,976 | A | 7/2000 | Schneider et al. |
| 6,089,978 | A | 7/2000 | Adams |
| 6,093,102 | A | 7/2000 | Bennett |
| 6,120,377 | A | 9/2000 | McGinnis, Sr. et al. |
| 6,126,542 | A | 10/2000 | Fier |
| 6,135,884 | A | 10/2000 | Hedrick et al. |
| 6,159,098 | A | 12/2000 | Slomiany et al. |
| 6,186,894 | B1 | 2/2001 | Mayeroff |
| 6,322,309 | B1 | 11/2001 | Thomas et al. |
| 6,398,218 | B1 | 6/2002 | Vancura |
| 6,461,241 | B1 | 10/2002 | Webb et al. |
| 6,547,242 | B1 | 4/2003 | Sugiyama et al. |
| 6,607,438 | B2 | 8/2003 | Baerlocher et al. |
| 6,609,971 | B2 | 8/2003 | Vancura |
| 2003/0078089 | A1 | 4/2003 | Gray et al. |

FOREIGN PATENT DOCUMENTS

| | | |
|---|---|---|
| GB | 2 137 392 A | 10/1984 |
| WO | WO 00/12186 | 3/2000 |

OTHER PUBLICATIONS

Full House Advertisement, written by Anchor Games, published in 2000.

Gold Fever Advertisement, written by Atronic International Casino, published in 1999.

Gold Fever Advertisement, written by Casino Data Systems, published in 1997.

High Roller Video Article, written by Strictly Slots, published in Mar. 2001.

Jackpot Bingo, written by CDS.com, printed on Apr. 12, 2001.

Jewel in the Crown Brochure, written by Barcrest, Ltd, published prior to 2000.

Jewel in the Crown Advertisement, written by IGT, published in 1999.

Match Reel Game Bonus Description, written by IGT, published prior to 2000.

Texas Tea Article written by Strictly Slots, published in Jul. 2000.

Texas Tea Advertisement, written by IGT, published in 2000.

Texas Tea written by www.igt.com//games/new games/texastea, printed on Mar. 21, 2001.

GAMING DEVICE HAVING A FIRST GAME SCHEME INVOLVING A SYMBOL GENERATOR, A SECOND GAME AND FIRST GAME TERMINATOR

PRIORITY CLAIM

This application is a continuation of, claims priority to and claims the benefit of U.S. patent application Ser. No. 10/792,954 filed on Mar. 4, 2004, now issued as U.S. Pat. No. 6,981,917, which is a continuation of, claims priority to and the benefit of U.S. patent application Ser. No. 10/231,679 filed on Aug. 30, 2002, now issued as U.S. Pat. No. 6,733,389, which is a continuation-in-part of and claims the benefit of U.S. patent application Ser. No. 10/174,789 filed on Jun. 19, 2002, now issued as U.S. Pat. No. 6,682,419, which is a continuation of and claims the benefit of U.S. patent application Ser. No. 09/689,495 filed on Oct. 12, 2000, now issued as U.S. Pat. No. 6,461,241, the entire contents of which are incorporated herein.

BACKGROUND OF THE INVENTION

The present invention relates in general to a gaming device, and more particularly to a gaming device having a first game scheme involving a symbol generator, a second game and a first game terminator.

Contemporary gaming devices such as slot machines include a primary game and one or more bonus rounds. The primary games typically enable a player to generate one or more symbols using a symbol generator. The traditional symbol generator is a set of reels, where each reel displays a plurality of symbols. If the player reaches a predetermined combination of symbols, the player wins a value. In addition, if the player reaches a bonus triggering event, the gaming device advances the player to a bonus round where the player can accumulate additional values. The traditional bonus triggering event occurs when the player reaches a predetermined combination of symbols on a plurality of reels.

The existing primary games provide players with values and bonus triggering events based upon symbols that a player reaches using a symbol generator. These gaming devices do not include secondary games which accompany the symbol generator, wherein the secondary games also provide the player with values, bonus triggering events or other awards.

To increase player enjoyment and excitement, it is desirable to provide players with new game schemes for gaming devices which include a symbol generator and one or more secondary games for providing players with awards such as values and bonus triggering events.

SUMMARY OF THE INVENTION

The present invention overcomes the above shortcomings by providing a gaming device having a primary game which includes one or more, but preferably one, symbol generator and one or more secondary games. A symbol generator can be any mechanism in physical or video form, any mathematical calculation or model, any computer program or any technique which generates one or more symbols. Preferably, the symbol generator is a set of rotating reels where each reel displays a set of symbols. However, a symbol generator can involve other concepts such as a rotating wheel divided into a plurality of areas with symbols on those areas, a set of dice, one or more coins or a physical or virtual container which mixes a plurality of symbols and generates one or more symbols.

A secondary game can be any activity which provides a player with the opportunity to gain an award. The term award, as used herein includes one or more values or an opportunity to gain one or more values. Such an opportunity can be provided by triggering a bonus round. Preferably, a secondary game requires the player to complete a plurality of steps before reaching a win condition. When the player reaches a win condition in the secondary game, the gaming device provides the player with an award. Some examples of the preferred secondary games which require step-by-step progression are: (a) games which require a player to align a predetermined number of markers on a grid in a particular pattern; (b) games which involve the player competing against the gaming device, incorporating concepts such as those used in tic-tac toe, chess or checkers; and (c) games involving races and chases where the race or chase is carried out in a step-by-step process.

In operation, when the symbol generator generates one or more predetermined symbols, the gaming device operates or plays one or more secondary games. The gaming device may do so by enabling the player to use an input device to play the secondary game or the gaming device may automatically play the secondary game. If the player reaches a win condition in the secondary game, the gaming device provides the player with an award.

In one preferred embodiment, the symbol generator is a plurality of reels displaying a plurality of symbols, and each reel is associated with an independent secondary game. The secondary game involves a grid including a plurality of locations. When the player aligns a predetermined number of markers in a predetermined pattern on the grid, a win condition occurs. In operation, if a reel displays a predetermined symbol, the gaming device operates or plays the secondary game associated with that reel. The gaming device does so by displaying a marker at a particular location on the associated secondary game. Where the gaming device locates the marker can be predetermined or determined by the computer of the gaming device during the game. Preferably, the reel indicates where the marker will be located with a symbol which bears a message. Each time the reels spin, the process of generating a predetermined symbol and displaying a marker on the associated secondary game repeats itself until a win condition occurs. However, it should be appreciated that the symbols on a reel will not include a marker upon each spin of the reels.

In this embodiment, it is also preferable that each location on the grid of each secondary game is associated with a value. When a marker is positioned on the location, the player gains the value associated with that location. It is also preferable that the gaming device uses a cross-game symbol in conjunction with displaying a marker on a secondary game. A cross-game symbol is any symbol which is used by or displayed on the symbol generator and which is also used by or displayed on the secondary games. Preferably, the cross-game symbol is the same as the marker. Here, each reel displays at least one cross-game symbol, and when the symbol generator generates one or more predetermined symbols, the gaming device moves the cross-game symbol from the reels to the secondary games associated with such reels.

The game scheme of the present invention adds one or more secondary games to the traditional symbol generator used in primary games. When the symbol generator generates one or more predetermined symbols, the gaming device operates or plays one or more secondary games. When a player reaches a win condition in a secondary game, the gaming device provides the player with one or more of a variety of awards. Preferably, the award is a credit, bonus value or the triggering of a bonus round where the player can accumulate additional bonus value or credits.

In a further alternative embodiment of the present invention, the gaming device enables a player to play a first game having a symbol generator, a second game and a first game terminator. Preferably, the symbol generator includes a plurality of video reels. Preferably, each of the reels has a plurality of predetermined symbols thereon. In one embodiment, at least one of the reels includes at least one termination symbol and is sometimes referred to herein as a termination reel, and at least one of the other reels includes at least one second game triggering symbol and is sometimes referred to herein as second game triggering reel.

The gaming device further includes at least one independently operated second game. Preferably, each of the second games is associated with a different one of the second game triggering reels. The gaming device also includes a processor which controls the reels and the second games. If one of the predetermined second game triggering symbols occurs on one of the second game triggering reels, then the processor operates the second game associated with the second game triggering reel. It should be appreciated that the processor preferably only operates the second game that is associated with the second game triggering reel upon which the second game triggering symbol occurred. In alternative embodiments, the occurrence of the second game triggering symbol on the second game triggering reel could cause the processor to operate any one or all of the second games. Further, it should be appreciated that in alternative embodiments, a number of second game triggering symbols could be required to occur on the second game triggering reels before the processor operates the second game associated therewith.

When a termination trigger occurs on at least one of the termination reels, the processor terminates the first game. In one embodiment, the termination trigger is the occurrence of one of the predetermined termination symbols on one of the termination reels. In alternative embodiments, the termination trigger is the occurrence of more than one such as a designated number of the termination symbols on one of the termination reels. In further alternative embodiments, the termination trigger occurs across all of the termination reels.

Each second game includes at least one win condition in one embodiment of the gaming device according to the present invention. In one embodiment, the win condition includes a plurality of predetermined second game symbols. When the win condition occurs, the processor provides an award to the player. In one embodiment, the award is a predetermined number of free activations of the first game. Alternatively, the award could be a value, a credit, a number of credits, or an opportunity to gain a value.

In one embodiment, the second game includes an automatic win condition. In this embodiment, the player is able to select one choice from a plurality of displayed choices. Each displayed choice includes an associated award. Preferably, each displayed choice has a different award associated therewith. In one embodiment, the award is a predetermined number of free activations of the first game. Alternatively, the award could be a value, a credit, a number of credits, or an opportunity to gain a value.

In one embodiment, the player is able, with each activation of the second game, to select at least one choice from a plurality of displayed choices. In this embodiment, the player keeps selecting choices until a win condition occurs. The win condition could include all or a predetermined number of the plurality of displayed choices. Thus, the player must select all or a predetermined number of the plurality of displayed choices for the win condition to occur.

It should be appreciated that the player may only obtain an award associated with a win condition if the win condition is achieved prior to the termination of the first game. Thus, a player may only obtain an award associated with a win condition if all or a predetermined number of the choices are obtained prior to termination of the first game.

In one embodiment, the second game is reset after a random number of activations of the first game. Alternatively, the second game is reset after a predetermined number of activations of the first game. In one embodiment, the second game is reset to a state before any predetermined second game symbols or displayed choices have been acquired by a player. Thus, when a win condition in the second game includes a plurality of predetermined second game symbols, any second game symbols that the player had acquired would be automatically forfeited when the second game is reset.

In one embodiment of the present invention, a method for operating a gaming device is provided. The method includes a first step of providing a predetermined number of activations of a first game to a player. In one embodiment, the first game is a slot game including a plurality of video reels and the activations provided to the player are free spins of the reels. Preferably, each of the reels has a plurality of symbols thereon. The method further includes the steps of causing an activation of the first game and subtracting one activation from the activations (e.g., the free spins) provided to the player.

In one embodiment, the first game is terminated when a termination trigger occurs during the first game. Preferably, the termination trigger is associated with one of the reels. In one embodiment, the termination trigger is the occurrence of one of the predetermined termination symbols on the reel associated with the termination trigger. Alternatively, the termination trigger requires the occurrence of the more than one such as a designated number of the termination symbols on the reel associated with the termination trigger.

In one embodiment, the method further includes the step of initiating at least one independently operated second game when a predetermined event occurs during the first game. Preferably, each of the second games is associated with a different one of the reels. In one embodiment, the predetermined event is the occurrence of one of the predetermined second game triggering symbols on the second game triggering reel associated with the second game. Preferably, each second game is only initiated when the predetermined event occurs on the respective second game triggering reel.

The method, in one embodiment, repeats all of the steps from the step of causing an activation of the first game through the step of initiating the second game. Preferably, these steps repeat until the first game has been terminated or until the player has no activations or free spins remaining. Thus, the player may be able to exhaust their free spins before the first game terminates. However, it should be appreciated that if the termination trigger occurs, the remaining number of free spins are not able to be used as the first game terminates without giving the player an opportunity to exhaust the free spins.

It is therefore an object of the present invention to provide a gaming device having a game scheme involving a symbol generator and secondary award triggering games.

It is a further object of the present invention to provide a terminator for terminating the game scheme upon the occurrence of a predetermined termination trigger.

Additional features and advantages of the present invention are described in, and will be apparent from, the following Detailed Description of the Invention and the Figures.

DETAILED DESCRIPTION OF THE INVENTION

Gaming Device and Electronics

Figure 1A:
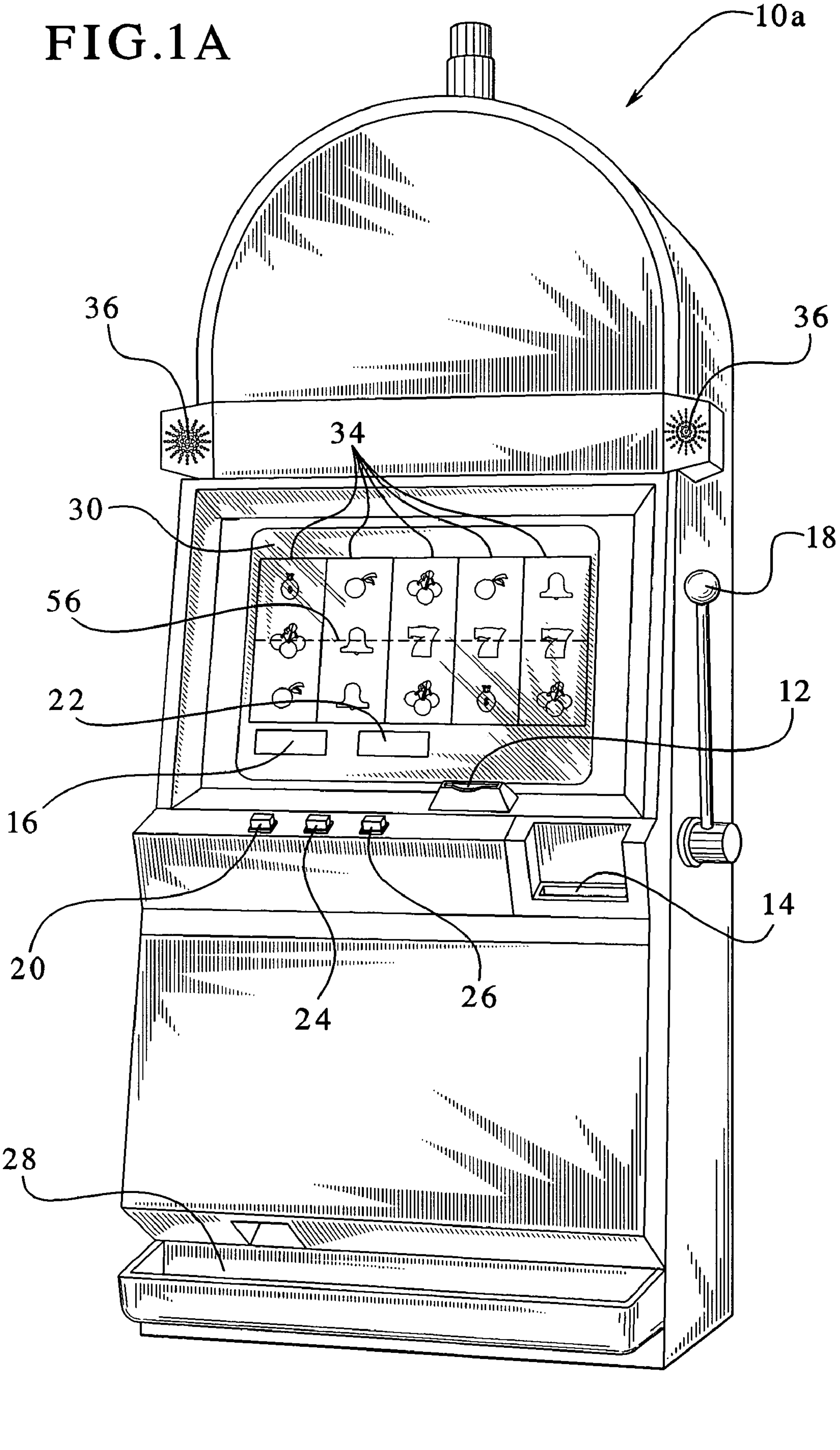
FIG. 1A is a perspective view of one embodiment of the gaming device of the present invention.
Figure 1B:
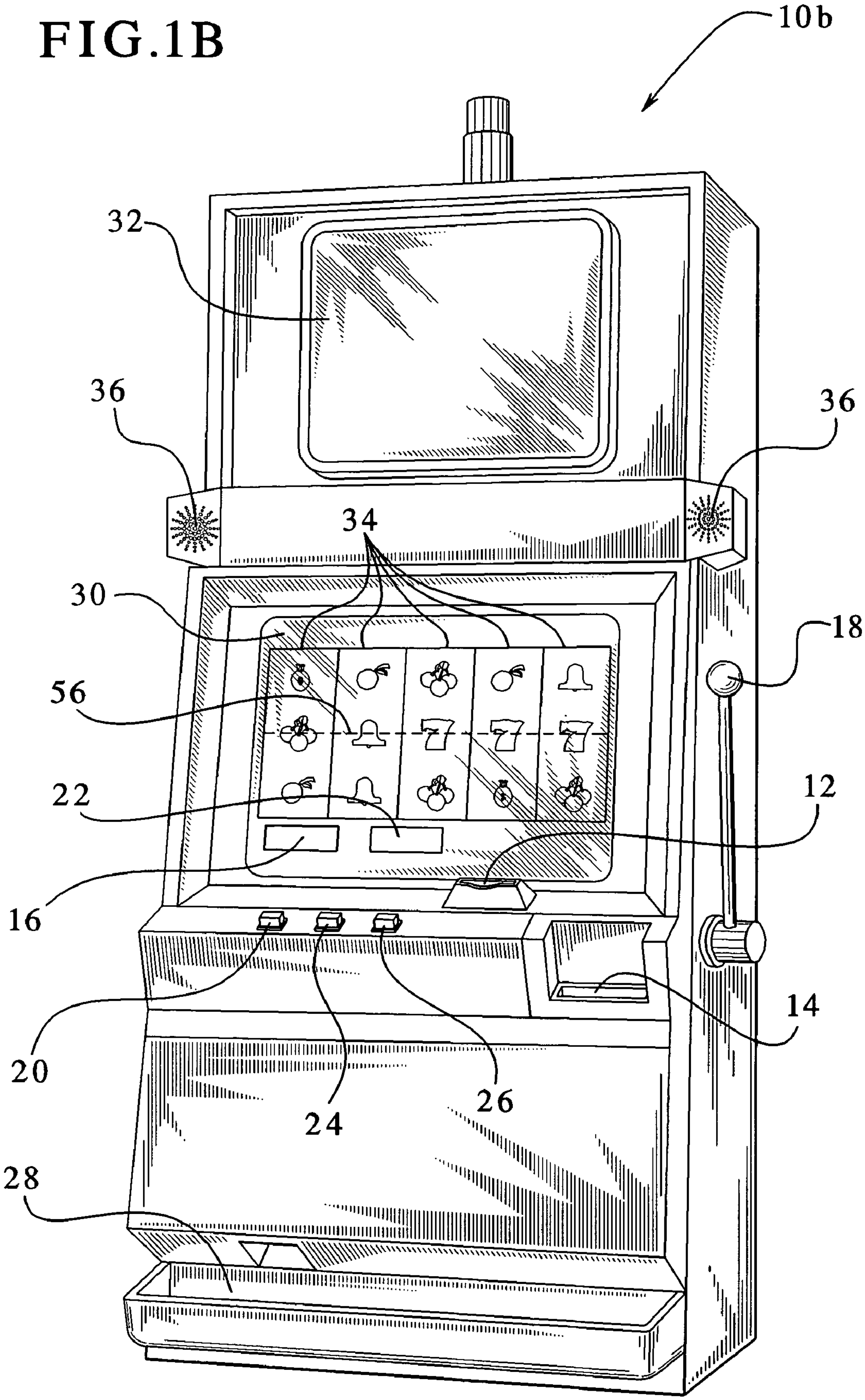
FIG. 1B is a perspective view of another embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 is preferably a slot machine having the controls, displays and features of a conventional slot machine. It is constructed so that a player can operate it while standing or sitting, and gaming device 10 is preferably mounted on a console. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any first game such as slot, poker or keno, any of their bonus triggering events and any of their bonus round games. The symbols and indicia used on and in gaming device 10 may be in mechanical, electrical or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

A player may cash out and thereby receive a number of coins corresponding to the number of remaining credits by pushing a cash out button 26. When the player cashes out, the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10 preferably displays a plurality of reels 34, preferably three to five reels 34 in mechanical or video form at one or more of the display devices. However, it should be appreciated that the display devices can display any visual representation or exhibition, including but not limited to movement of physical objects such as mechanical reels and wheels, dynamic lighting and video images. A display device can be any viewing surface such as glass, a video monitor or screen, a liquid crystal display or any other display mechanism. If the reels 34 are in video form, the display device for the video reels 34 is preferably a video monitor.

Each reel 34 displays a plurality of indicia such as bells, hearts, fruits, numbers, letters, bars or other images which preferably correspond to a theme associated with the gaming device 10. Furthermore, gaming device 10 preferably includes speakers 36 for making sounds or playing music.

Figure 2:
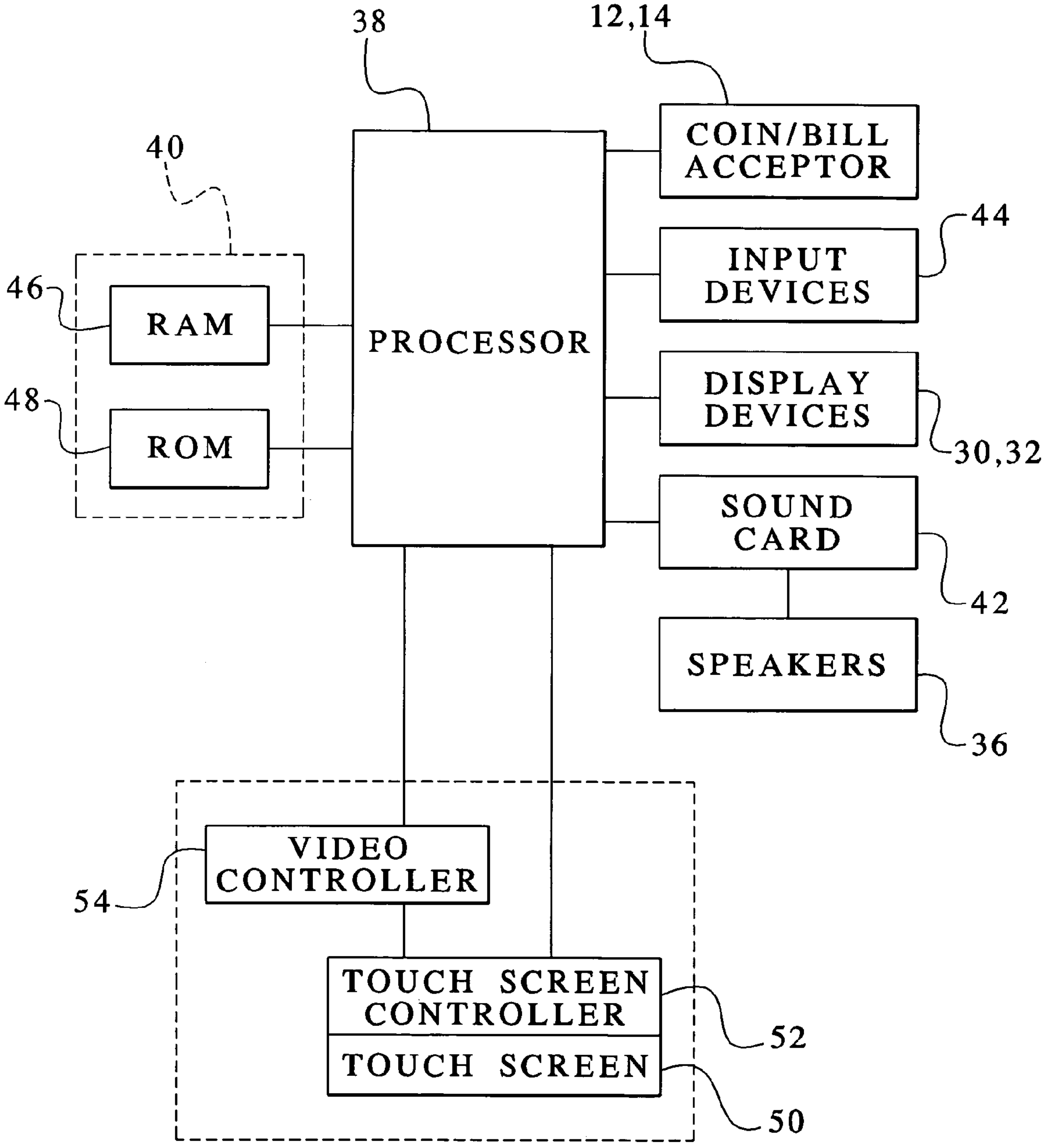
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42, a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively and/or alternatively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 is generally referred to herein as the "computer" or "controller."

With reference to FIGS. 1A, 1B and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, preferably gaming device 10 also gives players the opportunity to win credits in a bonus round. This type of gaming device 10 will include a program which will automatically begin a bonus round when the player has achieved a qualifying condition in the game. This qualifying condition can be a particular arrangement of indicia on a display device. The gaming device 10 preferably uses a video-based central display device 30 to enable the player to play the bonus round. Preferably, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Game Scheme

The game scheme of the present invention includes one or more symbol generators 100, preferably one, in a first game and one or more secondary games 102. The preferable symbol generator 100 (shown in FIGS. 6, 7 and 8) is a set of video reels 34. However, it should be appreciated that the present invention can include any type of symbol generator 100. Similarly, the present invention can include any type of secondary game 102. Preferably, the secondary game 102 requires the player to complete a predetermined plurality of steps before achieving a win condition in the secondary game 102.

Figure 3:
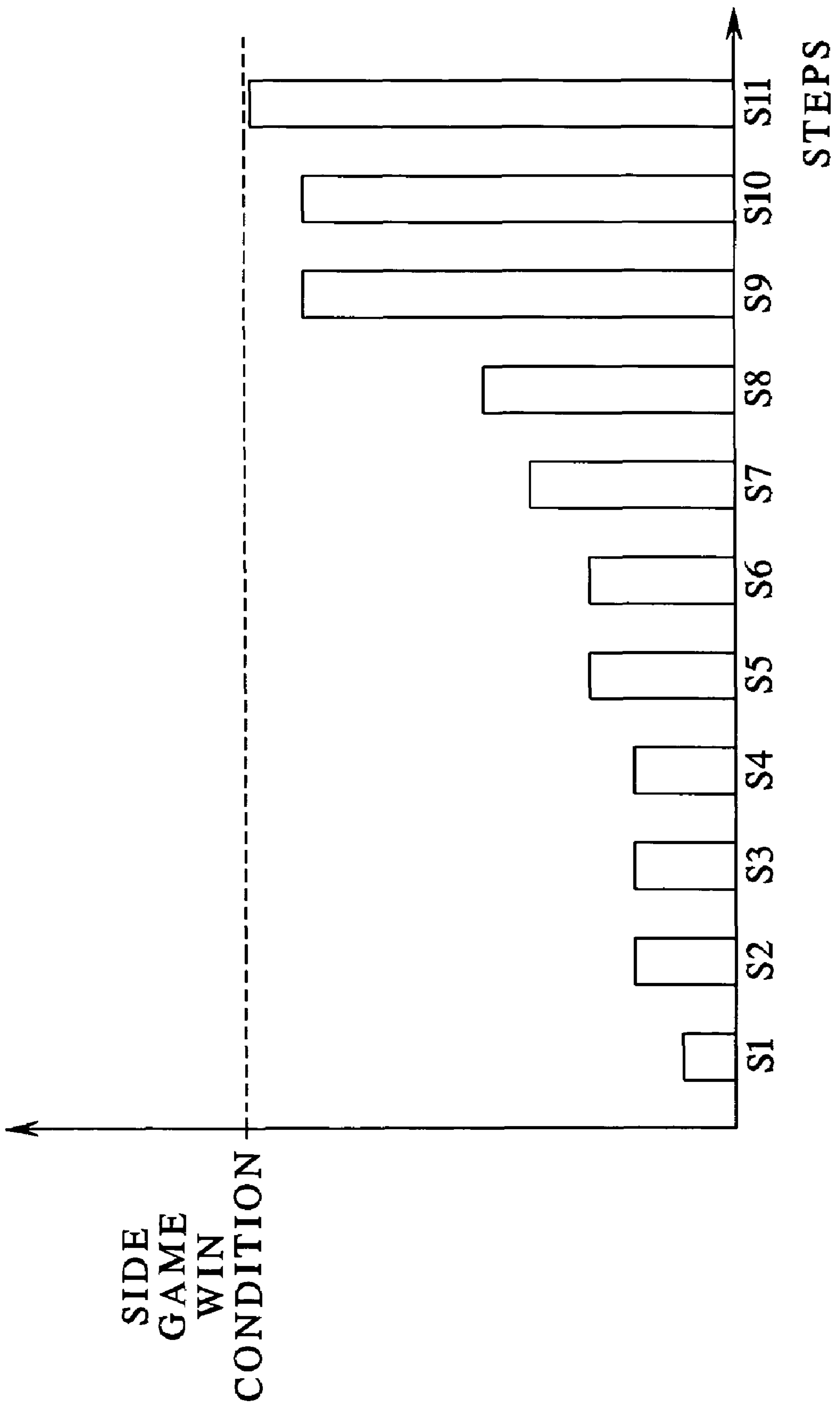
FIG. 3 is a bar graph illustrating a plurality of steps taken to reach a secondary game win condition in one embodiment of the present invention.

As illustrated in FIG. 3, one preferred secondary game 102 could require a player to complete eleven steps before achieving a win condition. The steps are indicated by the notation, S1 through S11. This example is included merely for illustrative purposes and any secondary game 102 can require any number of steps to be taken. This type of step-by-step secondary game 102 preferably incorporates one or more concepts of the following types of games: (a) games requiring a player to align a predetermined number of markers in a predetermined pattern on a grid, such as bingo; (b) tic-tac-toe; (c) chess; (d) checkers; (e) games where the player competes against the gaming device, such as race games or chase games; and (f) any other game where the player is unable to achieve a win condition in one step.

Figure 4A:
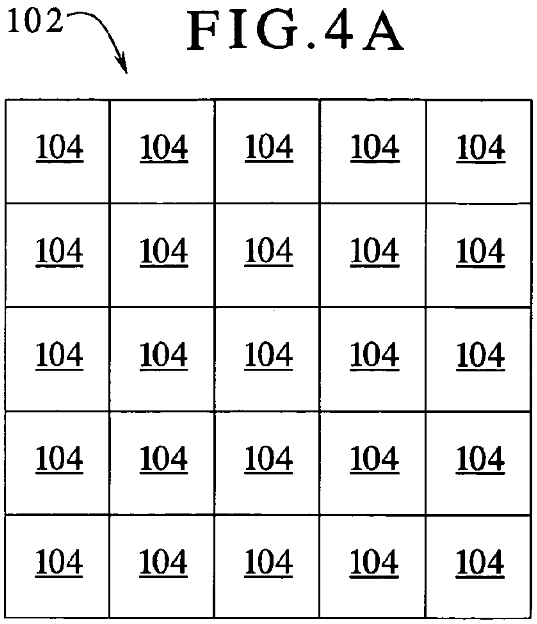
FIGS. 4A and 4B are top plan views of a secondary game in one embodiment of the present invention.
Figure 4B:
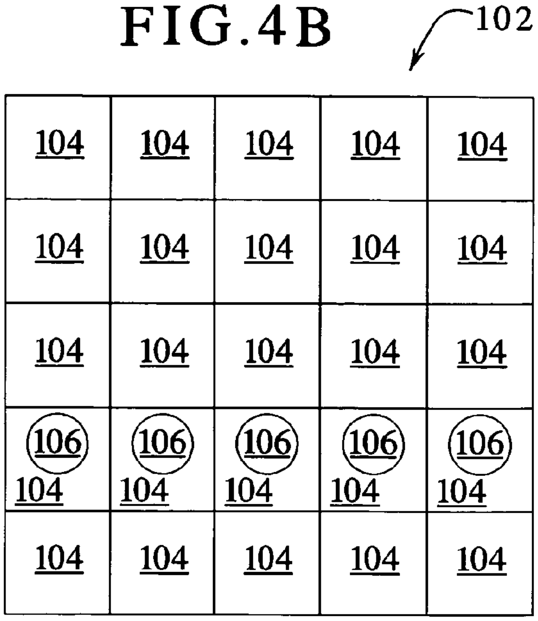

Two such step-by-step secondary games 102 are shown in FIGS. 4A, 4B, 5A, 5B and 5C. In FIGS. 4A and 4B, the secondary game 102 involves a plurality of locations 104 arranged in a grid. The object of the game is to position a complete row or column of markers 106 on the grid. In the example shown in FIG. 4A, the secondary game 102 initiates with no markers 106 being displayed on any of the locations 104. With each step, the gaming device positions a marker 106 on a location 104. Where the gaming device locates a marker 106 can be predetermined by the gaming device or determined by the gaming device during the operation of the secondary game 102. In the latter case, the gaming device can determine locations for the marker 106 randomly or by using any predetermined mathematical calculation. When the gaming device establishes a complete row or column of markers 106, a win condition occurs. In the example shown in FIG. 4B, the gaming device established a complete row of markers 106 in the second to last row of the grid of secondary game 102. This event established a win condition.

Figure 5A:
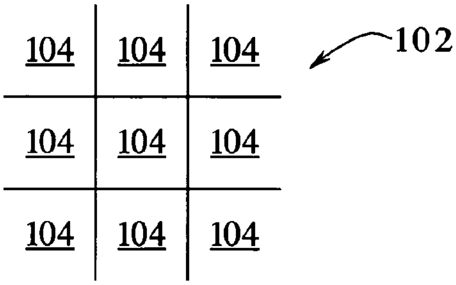
FIGS. 5A to 5C are top plan views of another secondary game in one embodiment of the present invention.
Figure 5B:
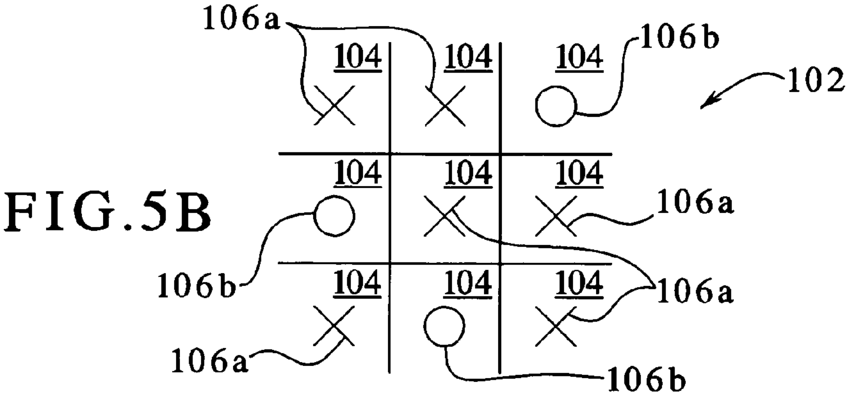
Figure 5C:
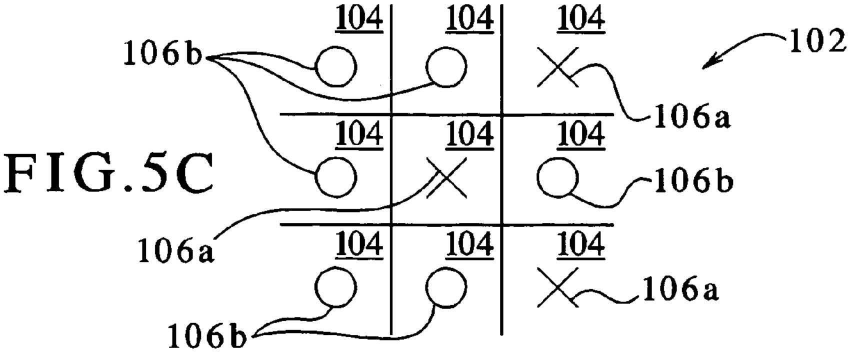

FIGS. 5A through 5C illustrate a secondary game 102 which involves the game tic-tac-toe. In this secondary game 102, the player competes against the gaming device. If the player establishes a line of three markers 106*a* on three locations 104, a win condition occurs. If the gaming device establishes a line of three markers 106*b* on three locations 104, the secondary game 102 preferably clears all markers from the secondary game 102 and restarts the game. This type of secondary game 102 operates in steps by a player using an input device to display a marker 106*a* followed by the computer of the gaming device displaying a marker 106*b*. In FIG. 5A, the secondary game is shown at the beginning of the game with no markers 106. FIG. 5B shows the end of a game, where the player reached a win condition by establishing a diagonal line of markers 106*a*. FIG. 5C shows a point in the game which precedes the game being restarted. It should be appreciated that the game scheme of the present invention can include secondary games 102 which would not require steps and secondary games 102 which do require steps. For example, a secondary game could be a type of symbol generator in and of itself.

Figure 6:
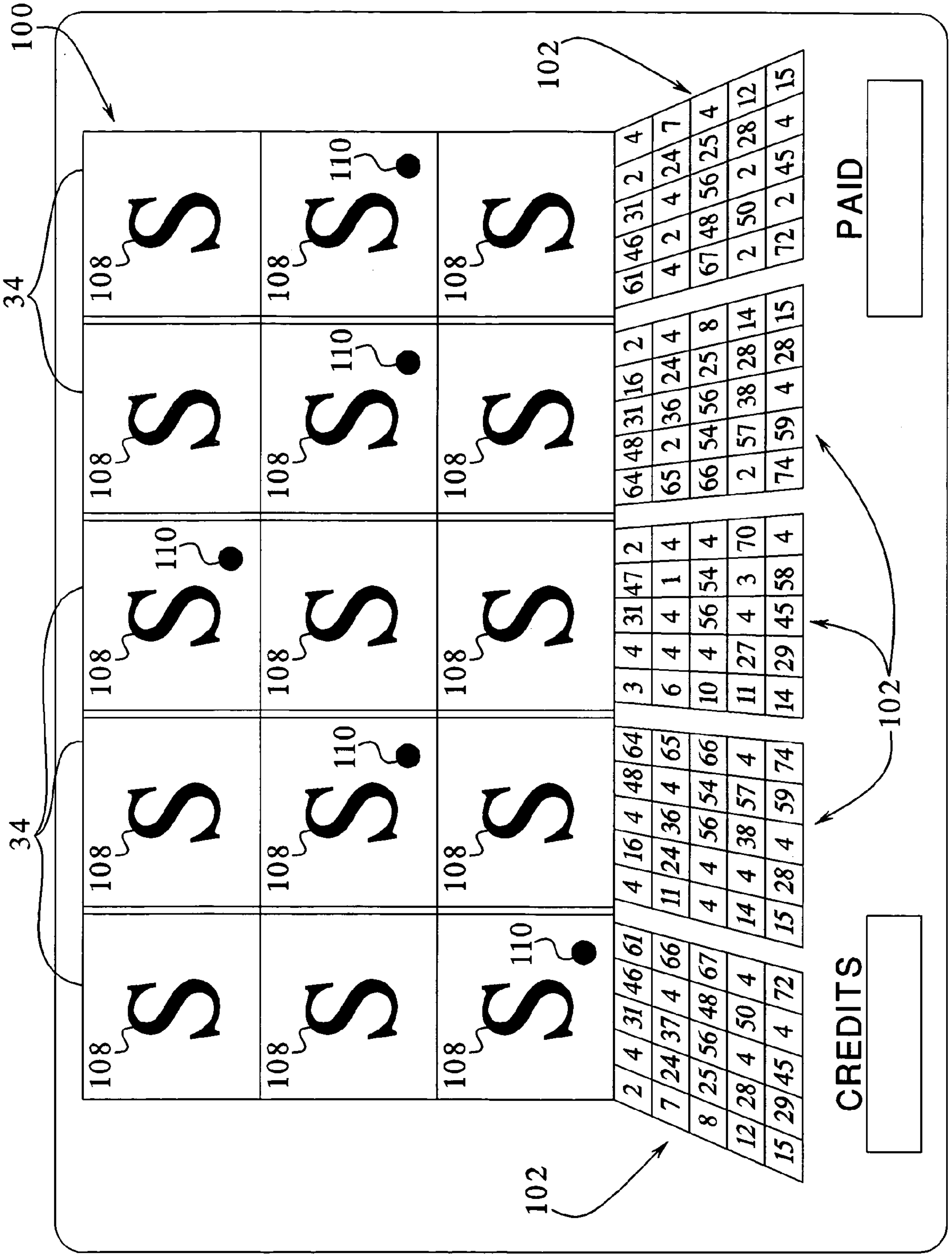
FIG. 6 is a top plan view of the initiation of a first game in one embodiment of the present invention.

FIG. 6 illustrates a preferred embodiment of the present invention which includes the preferred first game of the present invention and step-by-step secondary games 102. Here, the symbol generator 100 is a set of five reels 34. Each reel 34 displays a plurality of reel symbols 108 identified in FIG. 6 as the capital letter S. When the player activates an input device, such as play button 20, the reels 34 rotate.

When the reels 34 stop rotating, if one or more reels 34 display a predetermined symbol 108, the gaming device operates or plays the secondary games 102, each of which is associated with a reel 34.

Figure 7:
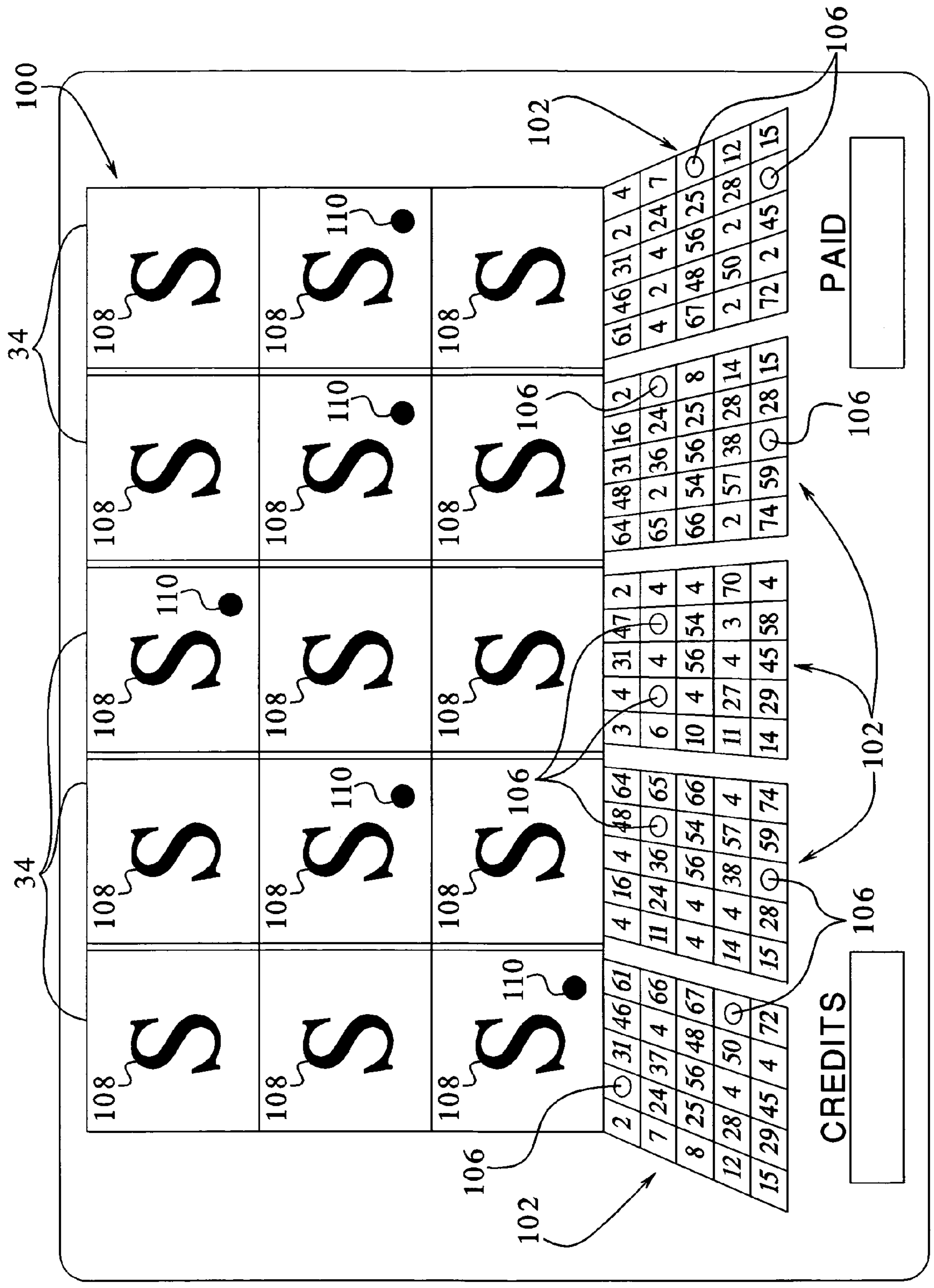
FIG. 7 is a top plan view of a first game in progress in one embodiment of the present invention.
Figure 8:
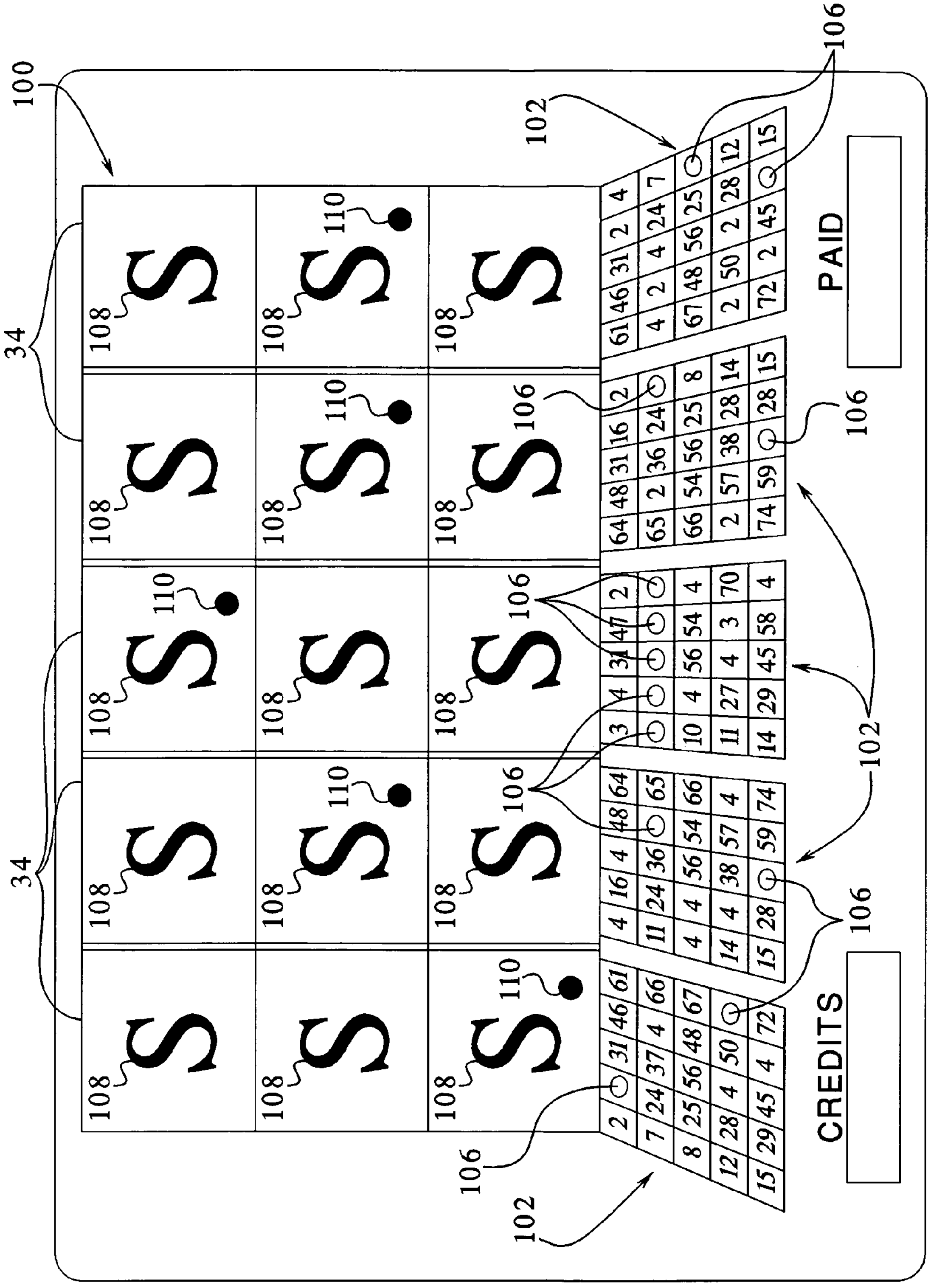
FIG. 8 is a top plan view of a secondary game win condition in a first game in one embodiment of the present invention.

The secondary games 102 shown in FIG. 6 generally operate in the same manner of the secondary game 102 illustrated in FIG. 4. However, here the locations of the secondary games 102 are identified by and associated with numerals as shown in FIGS. 6 through 8. In addition, when the player reaches a predetermined reel symbol 108 on any one reel 34, the gaming device displays a cross-game symbol 110 on that reel 134 and moves the cross-game symbol 110 from the reel 34 to the secondary game 102 associated with that reel 34. Furthermore, the cross-game symbol 110 bears a numeric message which indicates the numeral of the location on the grid where the marker 106 will be positioned. In this preferred embodiment, the cross-game symbol 110 is the same as marker 106. Therefore, the gaming device moves the cross-game symbols 110 from the reels 34 to the locations on the secondary games 102. There, the cross-game symbol 110 functions as a marker 106. It should be appreciated that the present invention can be adapted to enable the player to gain value associated with a location when a marker is displayed at a location.

Initially, it is preferable that in this preferred embodiment the first game begins with no markers 106 being displayed at any of the secondary games 102, as shown in FIG. 6. However, the present invention can be adapted so that the first game begins with one or more markers 106 being displayed at one or more of the secondary games 102. In operation, the gaming device causes reels 34 to spin. On each spin the secondary game associated with each reel may or may not progress. As each reel 34 displays predetermined reel symbols 108, the gaming device displays cross-game symbols 110. The cross-game symbols indicate where the marker 106 will be located in the associated secondary game by displaying a numeral momentarily. Then the gaming device moves the cross-game symbols 110 from the reels 34 to the associated secondary games 102 where the cross-game symbols function as markers 106. The present invention can be adapted so that when a marker 106 is located at a location on a secondary game 102, the gaming device provides the player with the value associated with that location.

In time, one or more secondary games 102 accumulate a plurality of markers 106 as shown in FIG. 7. It should be appreciated that, when a reel displays a predetermined reel symbol 108, the gaming device can display more than one marker 106 at any one secondary game 102. In FIG. 8, secondary game 102 associated with the middle reel 34 displays a complete row of markers 106. In this example, when a player achieves this complete row, the secondary game 102 provides the player with an award. Preferably, the award is the triggering of a bonus round where the player can accumulate additional value. The secondary games can clear and restart themselves when any predetermined event or events occur.

The game scheme of the present invention provides gaming devices with secondary games which accompany traditional symbol generators in first games. When a symbol generator generates one or more predetermined symbols, the gaming device operates or plays one or more secondary games. Preferably, the symbol generator is a plurality of reels and each reel is associated with an independent secondary game. Furthermore, it is preferable that secondary games require a player to complete multiple steps before reaching a win condition in the secondary games. When a win condition occurs, the secondary game provides the player with an award. Preferably, this award is a bonus value, a credit or the triggering of a bonus round.

First Game Scheme Including a Second Game and a First Game Terminator

Figure 9A:
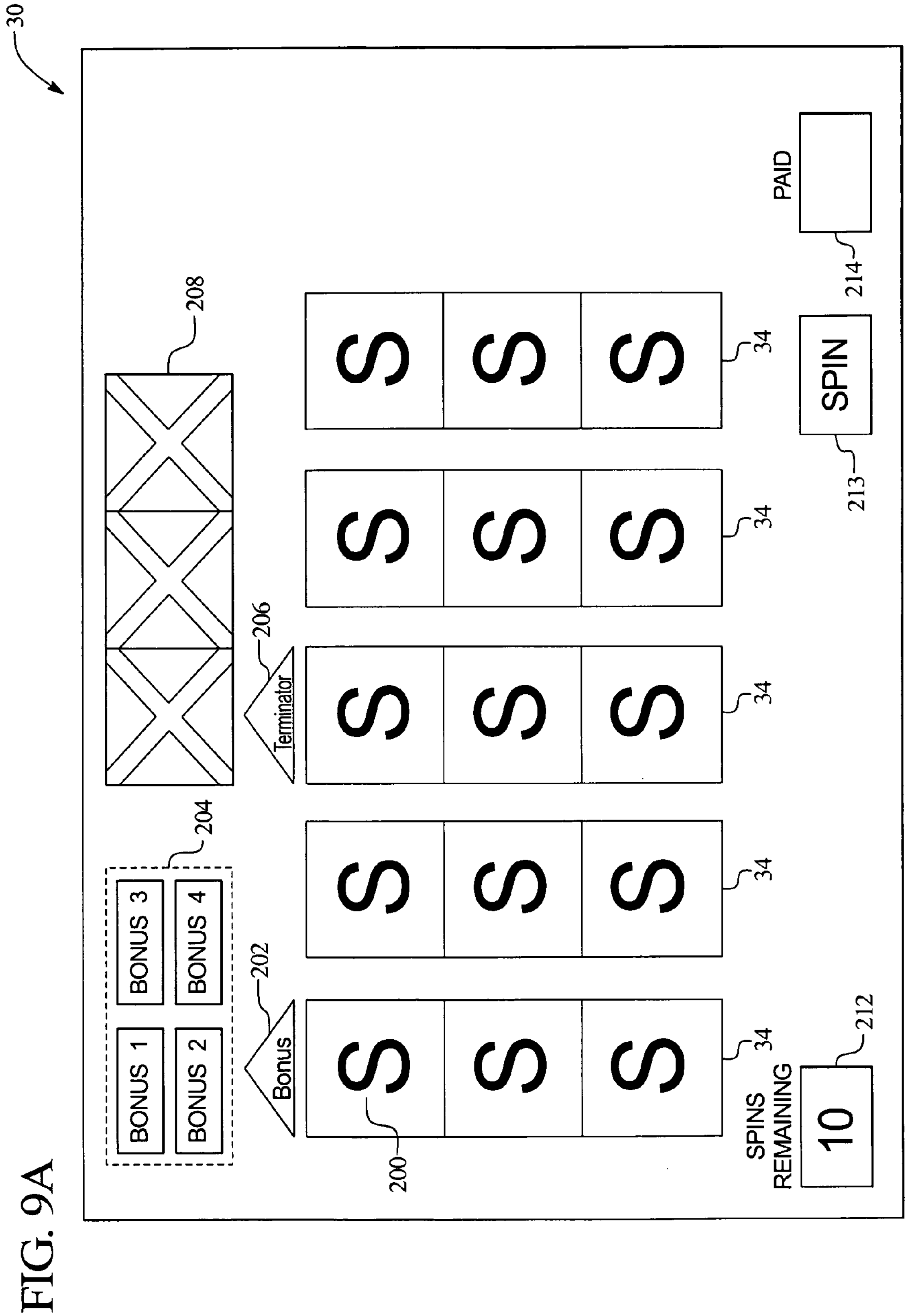
FIGS. 9A to 9E are enlarged front elevation views of one of the display devices of FIGS. 1A and 1B illustrating one embodiment of the present invention.

Referring now to FIG. 9A, a central display device 30 generally illustrates one embodiment of the present invention. The central display device 30 preferably is a touch screen display device. The first game in this embodiment is a slot game having a plurality of video reels 34, a termination indicator 208 associated with one of the reels 34, and a second game 204 associated with another one of the reels 34.

This first game in this embodiment is a slot game, but it should be appreciated that any suitable type of game may be used in alternative embodiments. Further, this embodiment uses a plurality of video reels 34 as a symbol generator. However, it should be appreciated that alternative embodiments of the present invention can include any suitable type of symbol generator such as mechanical reels, video wheels and mechanical wheels. Further alternative embodiments could also employ a symbol generator such as that used in video poker and blackjack games, that is, a video representation of playing cards. Similarly, alternative embodiments of the present invention could include a plurality of second games 204 with each second game being associated with a different one of the reels 34.

The slot game in this embodiment operates in a free spin mode. Typically, in a free spin mode, a player is awarded a number of free spins or activations of the first game and game play continues until the player has exhausted all of their remaining spins. In this embodiment, the first game continues until the player has exhausted all of their free spins, or until the termination indicator 208 indicates that a predetermined termination trigger has been achieved.

Free spin modes of operation are typically employed in conjunction with secondary or bonus games. In one embodiment, the first game is a secondary or bonus game and the second game is a further secondary or bonus game. In one alternative embodiment, the first game is a primary game and the second game is a secondary or bonus game.

In one embodiment, the predetermined termination trigger is the occurrence of three "strikes" or termination symbols on the termination reel associated with the termination indicator 208. In alternative embodiments, the termination trigger could be the occurrence of any suitable number of "strikes." Further, in alternative embodiments, the termination trigger can be the occurrence of any suitable predetermined termination symbol on the reel associated with the termination indicator 208. "Strikes" are used as the termination symbol in this embodiment for illustrative purposes only.

The termination indicator 208 in this embodiment is associated with the third reel 34 as indicated by terminator reel indicator 206. Thus, a "strike" must occur on the third reel, that is, the termination reel, in order to advance the termination trigger on the termination indicator 208. In alternative embodiments, the termination indicator 208 could be associated with any of the reels 34, more than one of the reels 34, or a combination of symbols on the reels 34.

The second game 204 in this embodiment is associated with the first reel 34 as indicated by second game triggering reel indicator 202. Thus, a predetermined second game triggering symbol must occur on the first reel 34, that is, the second game triggering reel, to activate the second game 204. In alternative embodiments, the second game 204 could be associated with any of the reels 34, or their could be more than one second game 204 with each of the second games 204 being associated with a different one of the reels 34.

The spins remaining window 212 shows that the player has ten spins remaining. The video reels 34 in this embodiment randomly display symbols 200 for each symbol position on the reels 34. The player activates or spins the video reels 34 by, for example, pressing spin button 213. Alternatively, pressing a play button (not shown) could activate the video reels 34, or the reels 34 could be automatically activated once the player is awarded the free spins. When the video reels 34 have come to rest, each of the reels 34 is analyzed to determine whether a winning combination or other predetermined symbol has been produced.

Figure 9B:
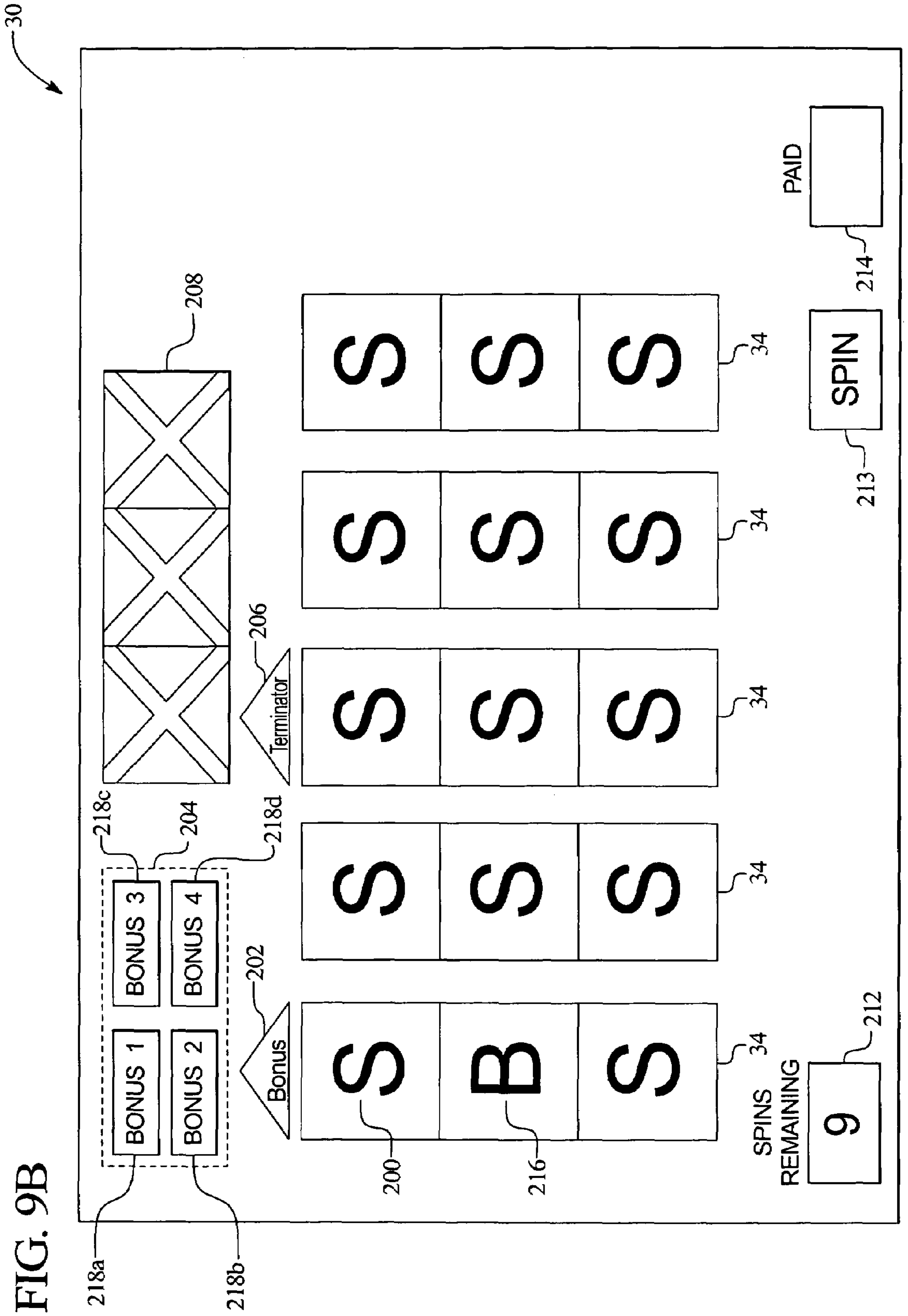

Referring now to FIG. 9B, an embodiment is shown in which a predetermined second game triggering symbol 216 labeled "B" has occurred on the first reel 34. The second game triggering symbol 216 has occurred on the second game triggering reel (i.e., the first reel 34) and causes the activation of the second game 204. The first game is temporarily suspended and the player is able to play the second game 204. As discussed above, the second game 204 could be any suitable type of secondary or bonus game, such as bingo, tic-tac-toe, blackjack, the like and combinations thereof.

In this embodiment, the second game 204 enables the player to select one choice from four displayed choices, labeled "Bonus 1" 218*a*, "Bonus 2" 218*b*, "Bonus 3" 218*c* and "Bonus 4" 218*d*. In one embodiment, each of the displayed choices 218*a*, 218*b*, 218*c* and 218*d* has an award associated therewith.

Figure 9C:
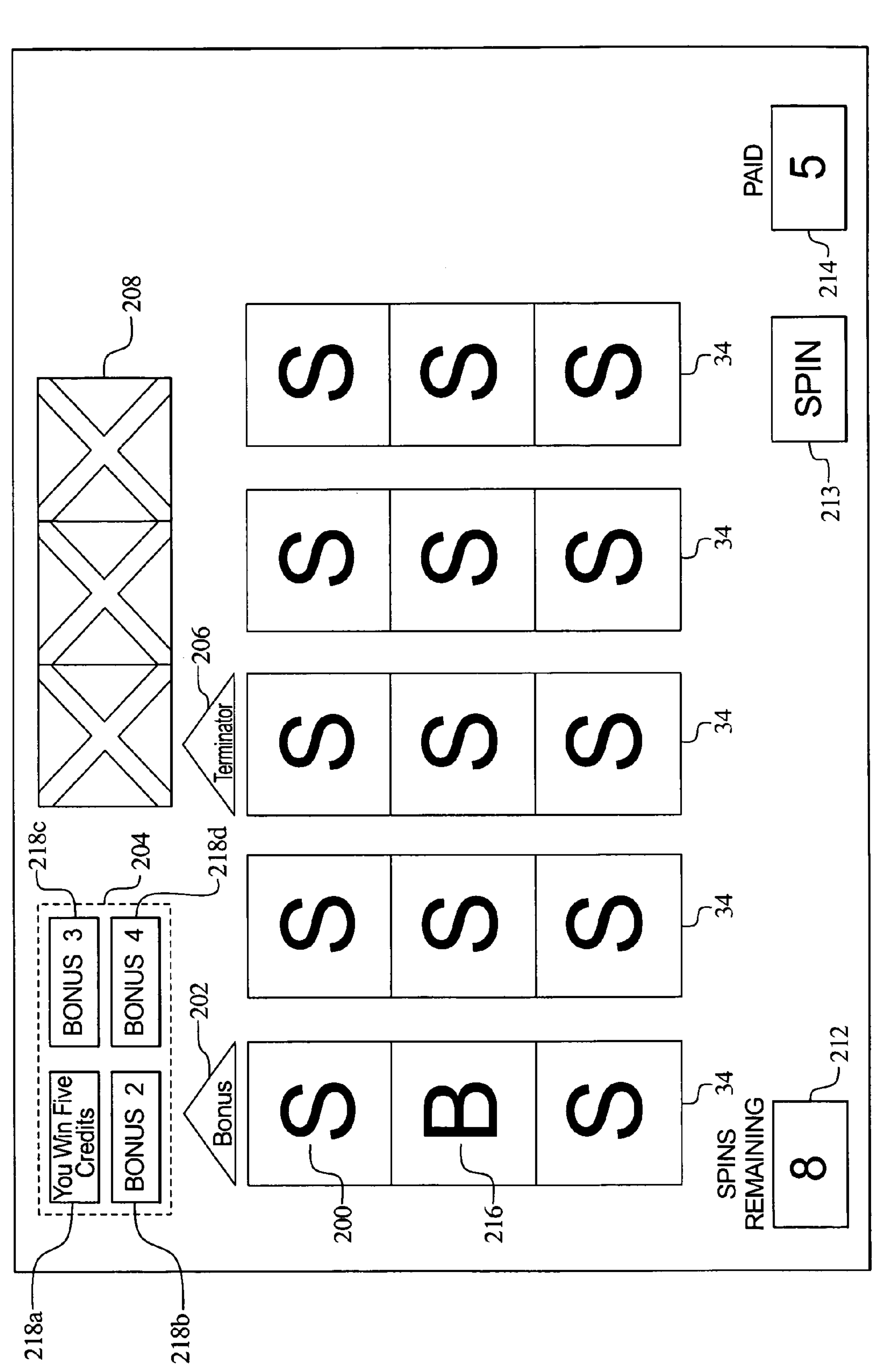

Referring now to FIG. 9C, the player has selected "Bonus 1" 218*a*, which reveals an award of five credits. The award of five credits is reflected in the paid window 214. After the award is paid, the second game 204 ends, or is suspended and the player returns to the first game where they are free to press the spin button 213 and spin the reels 34 once again.

In this embodiment of the second game 204, the player is able to select one choice from the four displayed choices 218*a*, 218*b*, 218*c* and 218*d*. However, it should be appreciated that alternatives embodiments of the second game 204 could allow the player to select a plurality of choices from the four displayed choices 218*a*, 218*b*, 218*c* and 218*d*. Alternatively, the processor could select a choice or a plurality of choices for the player. Further alternative embodiments of the second game 204 could also allow the player to choose from more or less than four displayed choices.

In one alternative embodiment of the second game, the player must collect or acquire all or a predetermined number of the displayed choices in order to achieve a win condition. Thus, the award associated with the win condition is not paid to the player until the player has selected or acquired all or a predetermined number of the displayed choices associated with the win condition.

For instance, where the win condition includes selecting all four of the displayed choices, the player must select all four of the displayed choices before the first game terminates in order to collect the award associated with the win condition. Therefore, if the player selects three of the displayed choices and the termination trigger occurs before the player is able to select the fourth displayed choice, the first game terminates and the player is not able to collect the award because the win condition did not occur. Similarly, if the player selects three of the displayed choices, but exhausts their free spins before they are able to select the fourth displayed choice, the first game terminates and the player is not able to collect the award because the win condition did not occur. However, if the player is able to select all four choice before the termination trigger occurs or before exhausting their free spins, then the win condition occurs and the player is paid the award associated with the win condition.

In one embodiment, after the occurrence of the termination trigger or after exhausting their free spins, the same player or a different player can reinitiate the first game and continue playing the first game in an attempt to obtain the win condition in the second game. For instance, where the player had previously selected three of the four displayed choices needed for the win condition and then the termination trigger occurred, the same player or a different player could reinitiate the first game and continue the first game in an attempt to select the fourth displayed choice and obtain the award associated with the win condition.

In one alternative embodiment, the second game is reset after a random or predetermined number of activations of the first game. That is, the displayed choices that were collected or acquired by the player are automatically forfeited and the player must again attempt to collect all or a predetermined number of the displayed choices before the win condition occurs and the award is paid. For instance, where the player had previously selected three of the four displayed choices needed for the win condition and then the termination trigger occurred, the player could reinitiate the first game and continue the first game in an attempt to select the fourth displayed choice and obtain the award associated with the win condition. However, in this embodiment, the second game is reset after a random or predetermined number of activations of the first game. Thus, the second game could reset before the player is able to select the fourth choice, thereby causing the player to automatically forfeit the three previously selected choices.

Figure 9D:
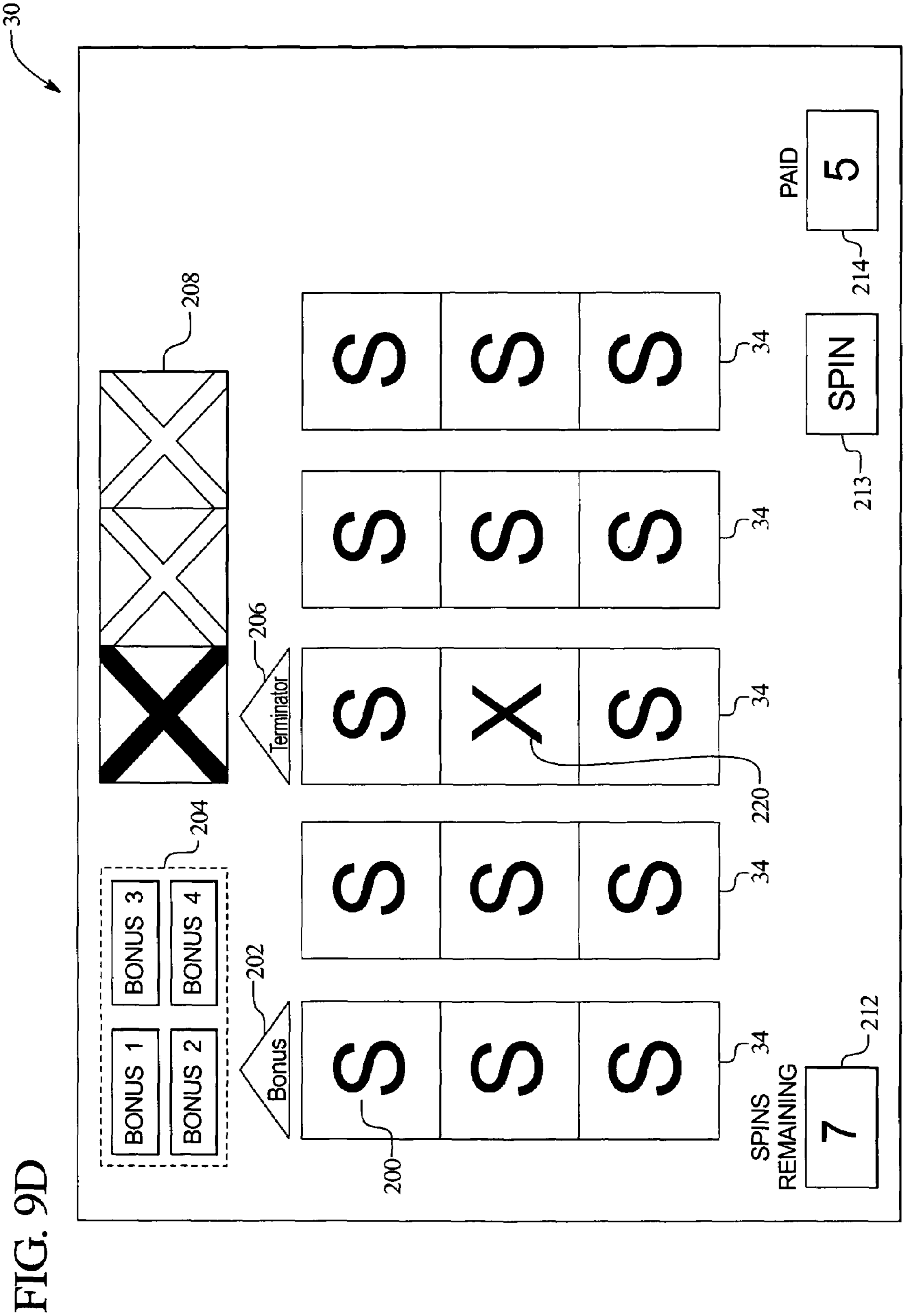

Referring now to FIG. 9D, the reels 34 have come to rest and a termination symbol 220, a "strike", has occurred on the third reel 34 which, as described above, is the termination reel that is associated with the termination indicator 208. This first "strike" is reflected in the termination indicator. If the player gets two more "strikes" for three total "strikes", then the first game will automatically terminate, even if the player previously had spins remaining as indicated by the spins remaining window 212.

Figure 9E:
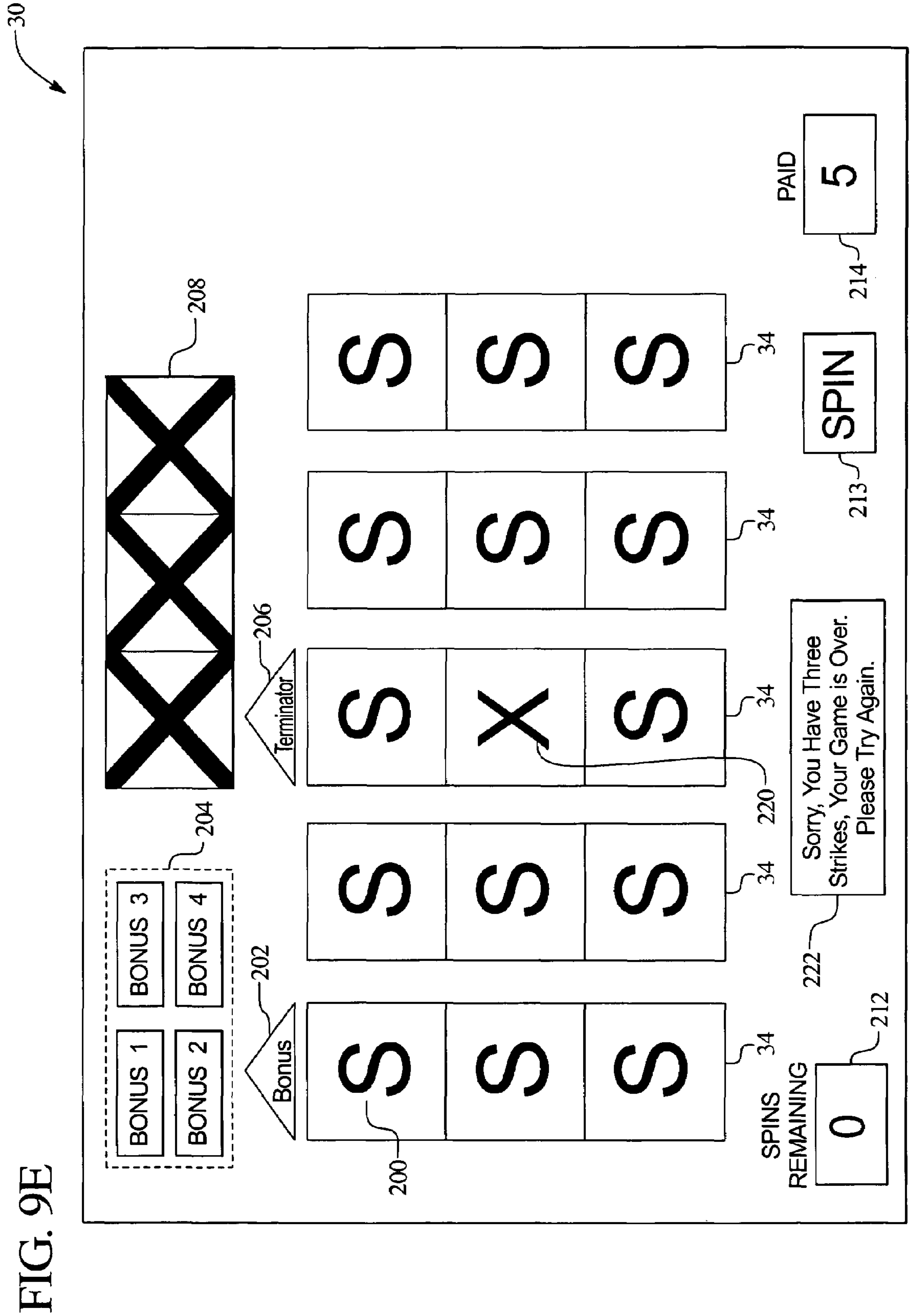

Referring now to FIG. 9E, the video reels 34 have once again come to rest and a termination symbol 220, a "strike" has once again appeared on the third reel 34 which is associated with the termination indicator 208. This "strike" is the third strike as indicated by the termination indicator 208 and thus, the first game automatically terminates as indicated by status window 222. The first game terminates because the player has received three "strikes" which, as described above, is the termination trigger for this embodiment. Accordingly, once the termination trigger has been achieved, the first game automatically terminates and the spins remaining window 212 reflects this by indicating that zero spins are remaining.

Figure 10:
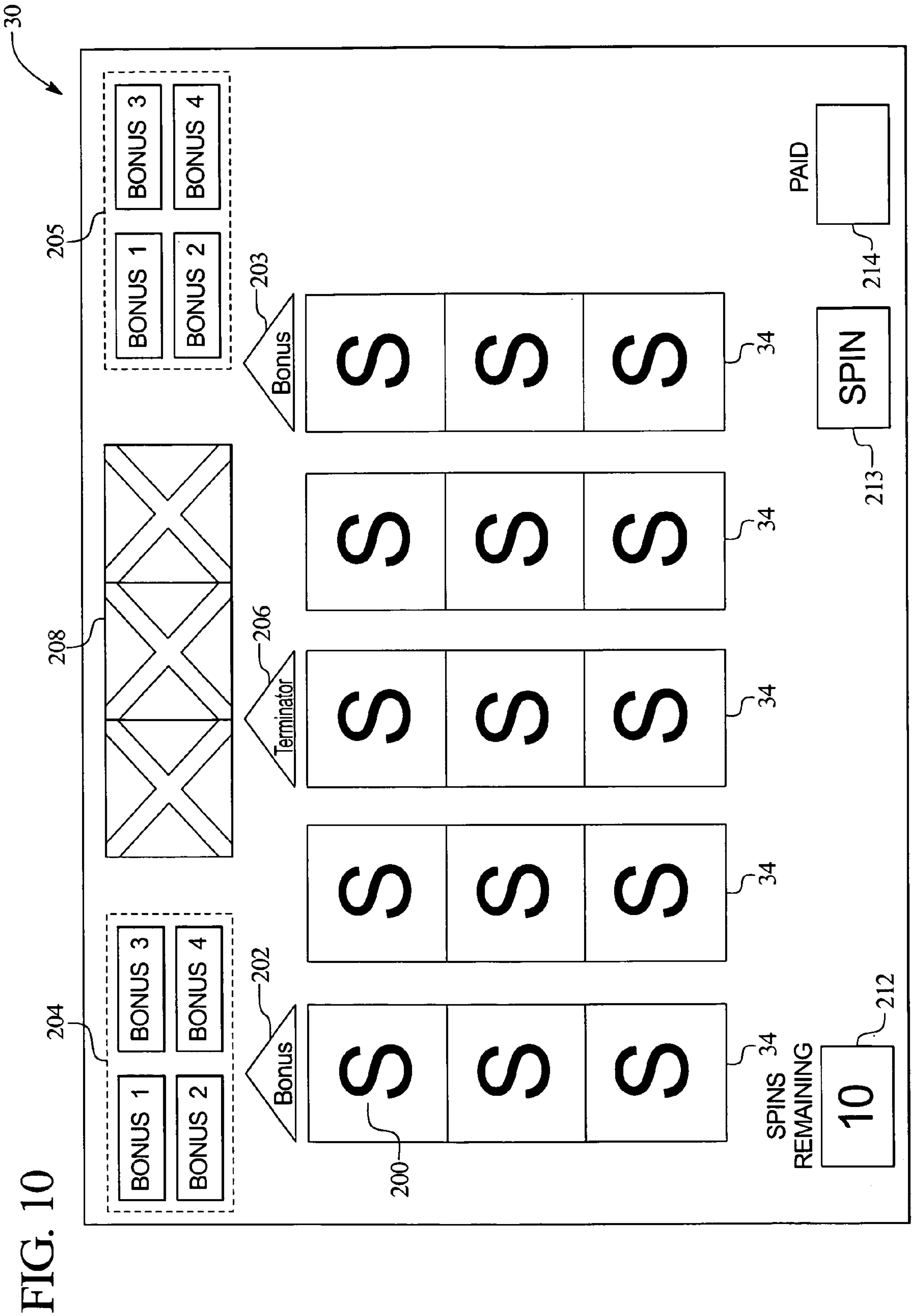
FIG. 10 is an enlarged front elevation view of one of the display devices of FIGS. 1A and 1B illustrating another embodiment of the present invention.

Referring now to FIG. 10, a central display device 30 generally illustrates one preferred embodiment of the present invention. The central display device 30 preferably is a touch screen display device. The first game in this embodiment is a slot game having a plurality of video reels 34, a termination indicator 208 associated with one of the reels 34, a first second game 204 associated with another one of the reels 34, and a second game 205 associated with another of one of the reels 34. Thus, this embodiment, unlike the embodiment described with reference to FIGS. 9A to 9E, further includes a second bonus or second game 205 that is associated with the fifth reel 34 as indicated by second game triggering reel indicator 203. The remaining features of this embodiment are substantially similar to the embodiment described with reference to FIGS. 9A to 9E and, therefore, a description thereof will be omitted.

Figure 11:
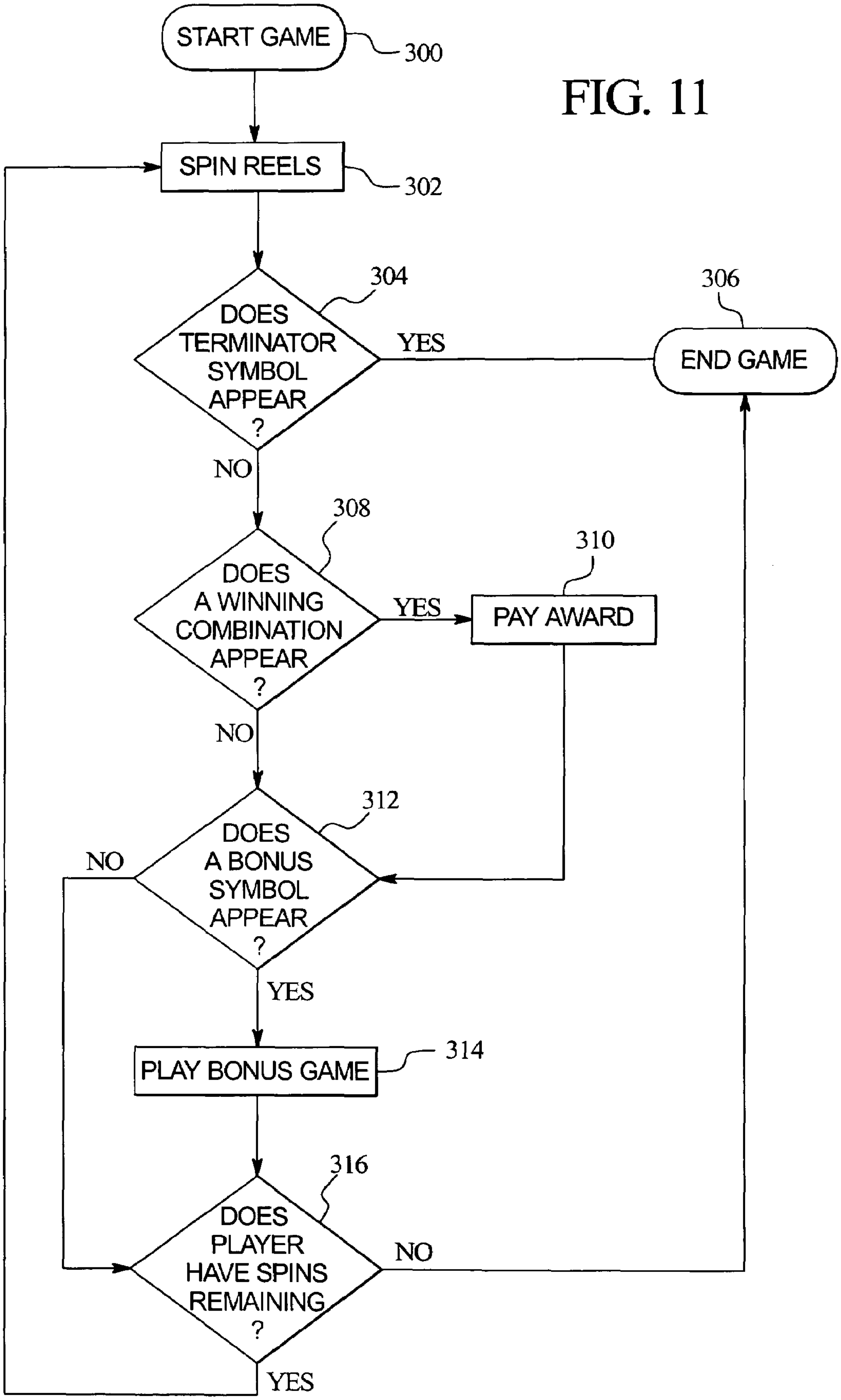
FIG. 11 is a flowchart illustrating an embodiment of a method for operating a gaming device.

Referring now to FIG. 11, an embodiment of a method for operating a gaming device having at least one second game and a first game terminator is described. The method starts at block 300 and continues to block 302 where the reels are spun. In this embodiment, there are five reels. However, it should be appreciated that any suitable number of reels may be employed as long as there are a plurality of reels.

A determination is made at decision diamond 304 as to whether a terminator or termination symbol appears. In this embodiment, only one termination symbol is needed to terminate the first game. As with the above embodiments, the termination symbol must appear on a termination reel associated with the termination trigger. If the termination symbol appears on the termination reel, then the first game is terminated as indicated by terminator 306.

If the termination symbol does not appear, then a determination is made to see whether a winning combination appears as indicated by decision diamond 308. If a winning combination appears, then the player is provided with the associated award as indicated by block 310. Subsequently, a determination is made at decision diamond 312 as to whether a bonus symbol or second game triggering symbol appears. As with the above-described embodiments, the second game triggering symbol must appear on a second game triggering reel associated with a second game. If the second game triggering symbol appears on the second game triggering reel, then the player plays the second or bonus game as indicated by block 314.

After playing the bonus game as indicated by block 314 or if a bonus symbol did not appear as determined by decision diamond 312, then another determination must be made at decision diamond 316, that is, whether the player has any free spins remaining. This embodiment, like the above-described embodiments, operates in a free spin mode. Thus, the player is free to play the first game until the first game is terminated or until they have no more spins remaining. If the player has spins remaining, then the reels are spun again as indicated by block 302 and game play proceeds as described above. If the player has no free spins remaining, then the first game ends as indicated by terminator 306.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A memory device which includes a plurality of instructions, that when executed by at least one processor, cause a gaming machine to:

(a) provide a predetermined number of activations of a first game, the first game including a plurality of reels, each of said reels having a plurality of symbols thereon;

(b) cause an activation of the first game and subtracting one activation from said predetermined number of activations;

(c) terminate the first game when a termination trigger occurs during the first game or when said predetermined number of activations have been exhausted, the termination trigger being associated with one of the reels;

(d) initiate at least one independently operated second game when a predetermined event occurs during the first game, each second game being associated with a different one of the reels, wherein each second game is initiated when the predetermined event occurs on the respective associated reel; and (e) repeat (b) to (d) until the first game is terminated.

2. The memory device of claim 1, wherein the plurality of instructions, when executed by the at least one processor, cause the gaming machine to select the first game from the group consisting of a primary game and a bonus game, and the second game includes a bonus game.

3. The memory device of claim 1, wherein the plurality of instructions, when executed by the at least one processor, cause the gaming machine to include at least one win condition in each second game.

4. The memory device of claim 3, wherein the plurality of instructions, when executed by the at least one processor, cause the gaming machine to include a plurality of predetermined second game symbols in the win condition.

5. The memory device of claim 3, wherein the plurality of instructions, when executed by the at least one processor, cause the gaming machine to provide an award when the win condition occurs in one of the second games.

6. The memory device of claim 5, wherein the plurality of instructions, when executed by the at least one processor, cause the gaming machine to add an additional predetermined number of activations to said predetermined number of activations.

7. The memory device of claim 5, wherein the plurality of instructions, when executed by the at least one processor, cause the gaming machine to select the award from the group consisting of a value and an opportunity to gain a value.

8. The memory device of claim 1, wherein the plurality of instructions, when executed by the at least one processor, cause the gaming machine to enable a player to choose at least one of a plurality of displayed choices included in each second game, wherein at least one of the displayed choices has an award associated therewith.

9. The memory device of claim 1, wherein the plurality of instructions, when executed by the at least one processor, cause the gaming machine to add an additional predetermined number of activations to said predetermined number of activations.

10. The memory device of claim 1, wherein the plurality of instructions, when executed by the at least one processor, cause the gaming machine to select the award from the group consisting of a value and an opportunity to gain a value.

11. The memory device of claim 1, wherein the plurality of instructions, when executed by the at least one processor, cause the gaming machine to reset the second game after a random number of activations of the first game.

12. The memory device of claim 1, wherein the plurality of instructions, when executed by the at least one processor, cause the gaming machine to reset the second game after a predetermined number of activations of the first game.

13. The memory device of claim 1, wherein the plurality of instructions, when executed by the at least one processor, cause the gaming machine to include at least one occurrence of a termination symbol on the reel associated with the termination trigger.

14. The memory device of claim 1, which is selected from the group consisting of a detachable cartridge, a disk, a random access memory, a read only memory and an application-specific integrated circuit.

15. A memory device which includes a plurality of instructions, that when executed by at least one processor, cause a gaming machine to:

(a) initiate a first game, the first game including a plurality of reels, each of said reels having a plurality of symbols thereon;

(b) cause an activation of the reels;

(c) terminate the first game when a termination trigger occurs during the first game, the termination trigger being associated with one of the reels;

(d) initiate at least one independently operated second game when a predetermined event occurs during the first game, each second game being associated with a different one of the reels, each second game being initiated when the predetermined event occurs on the respective associated reel; and (e) repeat (b) to (d) at least once.

16. The memory device of claim 15, wherein the plurality of instructions, when executed by the at least one processor, cause the gaming machine to select the first game from the group consisting of a primary game and a bonus game, and the second game includes a bonus game.

17. The memory device of claim 15, wherein the plurality of instructions, when executed by the at least one processor, cause the gaming machine to include at least one win condition in each second game.

18. The memory device of claim 17, wherein the plurality of instructions, when executed by the at least one processor, cause the gaming machine to include a plurality of predetermined second game symbols in the win condition.

19. The memory device of claim 17, wherein the plurality of instructions, when executed by the at least one processor, cause the gaming machine to provide an award when the win condition occurs in one of the second games.

20. The memory device of claim 19, wherein the plurality of instructions, when executed by the at least one processor, cause the gaming machine to select the award from the group consisting of a predetermined number of free activations of the first game, a value, and an opportunity to gain a value.

21. The memory device of claim 15, wherein the plurality of instructions, when executed by the at least one processor, cause the gaming machine to include a plurality of displayed choices for each second game and enable a player to choose at least one of the displayed choices, wherein at least one of the displayed choices has an award associated therewith.

22. The memory device of claim 21, wherein the plurality of instructions, when executed by the at least one processor, cause the gaming machine to select the award from the group consisting of a predetermined number of free activations of the first game, a value, and an opportunity to gain a value.

23. The memory device of claim 15, wherein the plurality of instructions, when executed by the at least one processor, cause the gaming machine to reset the second game after a random number of activations of the first game.

24. The memory device of claim 15, wherein the plurality of instructions, when executed by the at least one processor, cause the gaming machine to reset the second game after a predetermined number of activations of the first game.

25. The memory device of claim 15, wherein the plurality of instructions, when executed by the at least one processor, cause the gaming machine to include at least one occurrence of a termination symbol on the reel associated with the termination trigger.

26. The memory device of claim 15, which is selected from the group consisting of a detachable cartridge, a disk, a random access memory, a read only memory and an application-specific integrated circuit.

27. A memory device which includes a plurality of instructions, that when executed by at least one processor, cause a gaming machine to:

(a) display a first game, said first game including a plurality of symbol generators, each of said symbol generators including a plurality of symbols, at least one of said symbol generators including a terminator symbol and at least one of said symbol generators including a second game triggering symbol;

(b) associate a termination condition with said symbol generator including said terminator symbol, said termination condition occurring when a designated number of the terminator symbols are generated by said symbol generator having said terminator symbol;

(c) activate the symbol generators;

(d) initiate and display an independently operated second game when the second game triggering symbol is generated by said symbol generator which has the second game triggering symbol; and (e) repeat (c) to (d) for a designated number of activations of the symbol generators until the termination condition occurs or until there are no activations remaining.

28. The memory device of claim 27, wherein the plurality of instructions, when executed by the at least one processor, cause the gaming machine to provide a plurality of selections, at least one of said selections including an award.

29. The memory device of claim 28, wherein the plurality of instructions, when executed by the at least one processor, cause the gaming machine to provide the award when a player picks said selection including said award.

30. The memory device of claim 27, wherein the plurality of instructions, when executed by the at least one processor, cause the gaming machine to provide a plurality of selections, a plurality of said selections including an award.

31. The memory device of claim 30, wherein the plurality of instructions, when executed by the at least one processor, cause the gaming machine to enable a player to pick at least one selection and provide the awards associated with the picked selections.

32. The memory device of claim 27, wherein the plurality of instructions, when executed by the at least one processor, cause the gaming machine to display a terminator display, wherein the terminator display indicates the number of terminator symbols generated by the symbol generator including said terminator symbol.

33. The memory device of claim 27, which is selected from the group consisting of a detachable cartridge, a disk, a random access memory, a read only memory and an application-specific integrated circuit.

34. A memory device which includes a plurality of instructions, that when executed by at least one processor, cause a gaming machine to:

(a) display a first game, said first game including a plurality of symbol generators, each of said symbol generators including a plurality of symbols, at least one of said symbol generators including a terminator symbol and at least one of said symbol generators including a predetermined symbol;

(b) display a plurality of independently operable second games, each of said second games being associated with at least one of said symbol generators including said predetermined symbol;

(c) associate a termination condition with said symbol generator including said terminator symbol, said termination condition occurring when a designated number of the terminator symbols are generated by said symbol generator having said terminator symbol;

(d) activate the symbol generators;

(e) initiate the second games associated with any symbol generators which generated the predetermined symbol; and (f) repeat (d) to (e) for a designated number of activations of the symbol generators until the termination condition occurs or until there are no activations remaining.

35. The memory device of claim 34, wherein the plurality of instructions, when executed by the at least one processor, cause the gaming machine to provide a plurality of selections for at least one of the initiated second games.

36. The memory device of claim 35, wherein the plurality of instructions, when executed by the at least one processor, cause the gaming machine to associate an award with one of the selections, wherein the award is when a player picks the selection including the award.

37. The memory device of claim 35, wherein the plurality of instructions, when executed by the at least one processor, cause the gaming machine to associate a plurality of awards with the selections, enable a player to pick at lest one of the selections and provide the awards associated with the picked selection.

38. The memory device of claim 35, wherein the plurality of instructions, when executed by the at least one processor, cause the gaming machine to associate awards with all of the selections, enable a player to pick at lest one of the selections and provide the awards associated with the picked selection.

39. The memory device of claim 35, wherein the plurality of instructions, when executed by the at least one processor, cause the gaming machine to reset the picked selections after a randomly determined number of activations of the first game.

40. The memory device of claim 35, wherein the plurality of instructions, when executed by the at least one processor, cause the gaming machine to reset the picked selections after a predetermined number of activations of the first game.

41. The memory device of claim 34, wherein the plurality of instructions, when executed by the at least one processor, cause the gaming machine to display a terminator display, wherein the terminator display indicates the number of terminator symbols generated by the symbol generator including said terminator symbol.

42. The memory device of claim 34, wherein the plurality of instructions, when executed by the at least one processor, cause the gaming machine to randomly determine the designated number of activations.

43. The memory device of claim 34, wherein the plurality of instructions, when executed by the at least one processor, cause the gaming machine to pre-determine the designated number of activations.

44. The memory device of claim 34, wherein the plurality of instructions, when executed by the at least one processor, cause the gaming machine to randomly determine the designated number of terminator symbols.

45. The memory device of claim 34, wherein the plurality of instructions, when executed by the at least one processor, cause the gaming machine to pre-determine the designated number of terminator symbols.

46. The memory device of claim 34, which is selected from the group consisting of a detachable cartridge, a disk, a random access memory, a read only memory and an application-specific integrated circuit.

47. A memory device which includes a plurality of instructions, that when executed by at least one processor, cause a gaming machine to:

(a) display a first game, said first game including a plurality of symbol generators, each of said symbol generators including a plurality of symbols, at least one of said symbol generators including a terminator symbol and at least one of said symbol generators including a second game triggering symbol;

(b) associate a termination condition with said symbol generator including said terminator symbol, said termination condition occurring when a designated number of the terminator symbols are generated by said symbol generator having said terminator symbol;

(c) activate the symbol generators;

(d) initiate and display an independently operated second game when the second game triggering symbol is generated by said symbol generator which has the second game triggering symbol; and (e) repeat (c) to (d) for a designated number of activations of the symbol generators until the termination condition occurs.

48. The memory device of claim 47, wherein the plurality of instructions, when executed by the at least one processor, cause the gaming machine to display a plurality of selections to the player, at least one of said selections including an award.

49. The memory device of claim 48, wherein the plurality of instructions, when executed by the at least one processor, cause the gaming machine to provide the award when a player picks said selection including said award.

50. The memory device of claim 48, wherein the plurality of instructions, when executed by the at least one processor, cause the gaming machine to display a plurality of selections, each of said selections including an award.

51. The memory device of claim 50, wherein the plurality of instructions, when executed by the at least one processor, cause the gaming machine to enable a player to pick at least one of the selections and provide the awards associated with the picked selections.

52. The memory device of claim 48, wherein the plurality of instructions, when executed by the at least one processor, cause the gaming machine to associate a termination indicator with the symbol generator including the terminator symbol, wherein the termination indicator indicates when the terminator symbol summary of the invention generated by the symbol generator.

53. The memory device of claim 47, which is selected from the group consisting of a detachable cartridge, a disk, a random access memory, a read only memory and an application-specific integrated circuit.

54. A memory device which includes a plurality of instructions, that when executed by at least one processor, cause a gaming machine to:

(a) display a first game, said game including a plurality of symbol generators, each of said symbol generators including a plurality of symbols, at least one of said symbol generators including a terminator symbol and at least one of said symbol generators including a predetermined symbol;

(b) display a plurality of independently operable second games, each of said second games being associated with at least one of said symbol generators including said predetermined symbol;

(c) associate a termination condition with said symbol generators including said terminator symbol, said termination condition occurring when a designated number of the terminator symbols are generated by said symbol generator having said terminator symbol;

(d) activate the symbol generators;

(e) initiate the second games associated with any symbol generators which generated the predetermined symbol; and (f) repeat (d) to (e) for a designated number of activations of the symbol generators until the termination condition occurs.

55. The memory device of claim 54, wherein the plurality of instructions, when executed by the at least one processor, cause the gaming machine to provide a plurality of selections for at least one of the initiated second games.

56. The memory device of claim 55, wherein the plurality of instructions, when executed by the at least one processor, cause the gaming machine to associate an award with one of the selections, wherein the award is provided when a player picks the selection including the award.

57. The memory device of claim 55, wherein the plurality of instructions, when executed by the at least one processor, cause the gaming machine to associate a plurality of awards with the selections, enable a player to pick at least one of the selections and provide the awards associated with the picked selections.

58. The memory device of claim 55, wherein the plurality of instructions, when executed by the at least one processor, cause the gaming machine to associate awards with all of the selections, enable a player to pick at least one of the selections and provide the awards associated with the picked selections.

59. The memory device of claim 55, wherein the plurality of instructions, when executed by the at least one processor, cause the gaming machine to reset the picked selections after a randomly determined number of activations of the first game.

60. The memory device of claim 55, wherein the plurality of instructions, when executed by the at least one processor, cause the gaming machine to reset the picked selections after a predetermined number of activations of the first game.

61. The memory device of claim 54, wherein the plurality of instructions, when executed by the at least one processor, cause the gaming machine to display a terminator, wherein the terminator display indicates the number of terminator symbols generated by the symbol generated including said terminator symbol.

62. The memory device of claim 54, wherein the plurality of instructions, when executed by the at least one processor, cause the gaming machine to randomly determine the designated number of activations.

63. The memory device of claim 54, wherein the plurality of instructions, when executed by the at least one processor, cause the gaming machine to pre-determine the designated number of activations.

64. The memory device of claim 54, wherein the plurality of instructions, when executed by the at least one processor, cause the gaming machine to randomly determine the designated number of terminator symbols.

65. The memory device of claim 54, wherein the plurality of instructions, when executed by the at least one processor, cause the gaming machine to pre-determine the designated number of terminator symbols.

66. The memory device of claim 54, which is selected from the group consisting of a detachable cartridge, a disk, a random access memory, a read only memory and an application-specific integrated circuit.

* * * * *

UNITED STATES PATENT AND TRADEMARK OFFICE

CERTIFICATE OF CORRECTION

PATENT NO. : 7,169,046 B2
APPLICATION NO. : 11/301773
DATED : January 30, 2007
INVENTOR(S) : Bayard S. Webb et al.

It is certified that error appears in the above-identified patent and that said Letters Patent is hereby corrected as shown below:

ON THE TITLE PAGE OF THE PATENT: Item [54]

In the Title change “AND FIRST” to --AND A FIRST--.

IN THE SPECIFICATION:

In column 1, line 3, change “AND FIRST” to --AND A FIRST--.

Signed and Sealed this

Thirty-first Day of July, 2007

JON W. DUDAS

*Director of the United States Patent and Trademark Office*